United States Patent
Tatsumi et al.

(10) Patent No.: US 9,116,367 B2
(45) Date of Patent: Aug. 25, 2015

(54) DRIVER FOR ELECTRO-ABSORPTION MODULATOR

(71) Applicant: Sumitomo Electric Industries, Ltd., Osaka-shi (JP)

(72) Inventors: Taizo Tatsumi, Yokohama (JP); Keiji Tanaka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 52 days.

(21) Appl. No.: 14/185,226

(22) Filed: Feb. 20, 2014

(65) Prior Publication Data
US 2014/0233083 A1    Aug. 21, 2014

(30) Foreign Application Priority Data

Feb. 20, 2013  (JP) ................................. 2013-030893

(51) Int. Cl.
| | | |
|---|---|---|
| *G02F 1/17* | (2006.01) | |
| *G02F 1/01* | (2006.01) | |
| *G02F 1/015* | (2006.01) | |

(52) U.S. Cl.
CPC .............. *G02F 1/0121* (2013.01); *G02F 1/17* (2013.01); *G02F 2001/0157* (2013.01)

(58) Field of Classification Search
CPC .. G02F 1/0121; G02F 1/17; G02F 2001/0157
See application file for complete search history.

(56) References Cited

U.S. PATENT DOCUMENTS

| | | | | |
|---|---|---|---|---|
| 5,706,117 A | * | 1/1998 | Imai et al. ..................... | 398/197 |
| 5,930,022 A | * | 7/1999 | Okuma ......................... | 359/248 |
| 6,014,392 A | * | 1/2000 | Imai et al. .................. | 372/38.02 |
| 7,061,950 B2 | * | 6/2006 | Hongo et al. ............... | 372/38.02 |
| 7,409,113 B2 | * | 8/2008 | Sumi et al. ......................... | 385/2 |
| 7,466,927 B2 | * | 12/2008 | Chandler ..................... | 398/193 |
| 8,718,107 B2 | * | 5/2014 | Lv ............................ | 372/29.011 |

FOREIGN PATENT DOCUMENTS

| | | |
|---|---|---|
| JP | 2000-059317 A | 2/2000 |
| JP | 2009-238965 A | 10/2009 |

* cited by examiner

*Primary Examiner* — David N Spector
(74) *Attorney, Agent, or Firm* — Venable LLP; Michael A. Sartori (57) ABSTRACT

A transmitter optical module implemented with an electro-absorption (EA) modulator is disclosed. The module includes an EA driver comprising a signal detector, an offset controller, and a driver circuit. The signal detector detects the existence of the modulation signal input thereto. The offset controller provides to the driver circuit the first offset to shift the cross point of the output of the driver circuit higher when the modulation signal exists; while, the second offset when the modulation signal disappear. The second offset lowers the output of the driver circuit to prevent the excess optical output of the transmitter optical module.

12 Claims, 11 Drawing Sheets

DRIVER FOR ELECTRO-ABSORPTION MODULATOR

BACKGROUND OF THE INVENTION

1. Field of the Invention

The present application relates to a driver for an electro-absorption (EA) modulator, in particular, the application relates to a driver to prevent an excess optical output when a modulation signal becomes absent.

2. Background Arts

Recent transmitter optical modules often install an external modulator to modulate light coming from an optical source as a continuous wave because the modulating frequency or the modulating speed in the recent optical communication system exceeds 25 Gbps or sometimes reaches 40 Gbps. One type of the external modulator is an EA modulator. Because an EA modulator inherently shows nonlinearity between the modulation signal and the optical output therefrom, a driver to driver the EA modulator usually provides a function to adjust the cross point of the output of the driver, namely, the input of the EA modulator.

The adjustment of the cross point of the output of the driver is carried out to superpose an offset in the output; accordingly, when the modulation signal is absent, the superposed offset possibly causes an excess optical output in the EA modulator. The present application is to provide a technique to prevent or suppress the excess optical output from the EA modulator.

SUMMARY OF THE INVENTION

An aspect of the present application relates to an driver to drive an electro-absorption (EA) modulator device. The driver of the application includes a signal detector that detects an existence of a modulation signal, a driver circuit that amplifies the modulation signal and generates an output signal, and an offset controller that controls the offset of the output of the driver circuit by providing first and second offsets to the driver circuit depending on the existence of the modulation signal detected by the signal detector. In the present application, the first offset sets the output of the driver circuit so as to compensate the non-linearity of the EA modulator device, while, the second offset sets the output of the driver circuit so as to prevent an excess optical output of the EA modulator device.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments of the present application will be described as referring to drawings. In the description of the drawings, numerals or symbols same or similar to each other will refer to elements same or similar to each other without duplicated explanations.

First Embodiment

Figure 1:
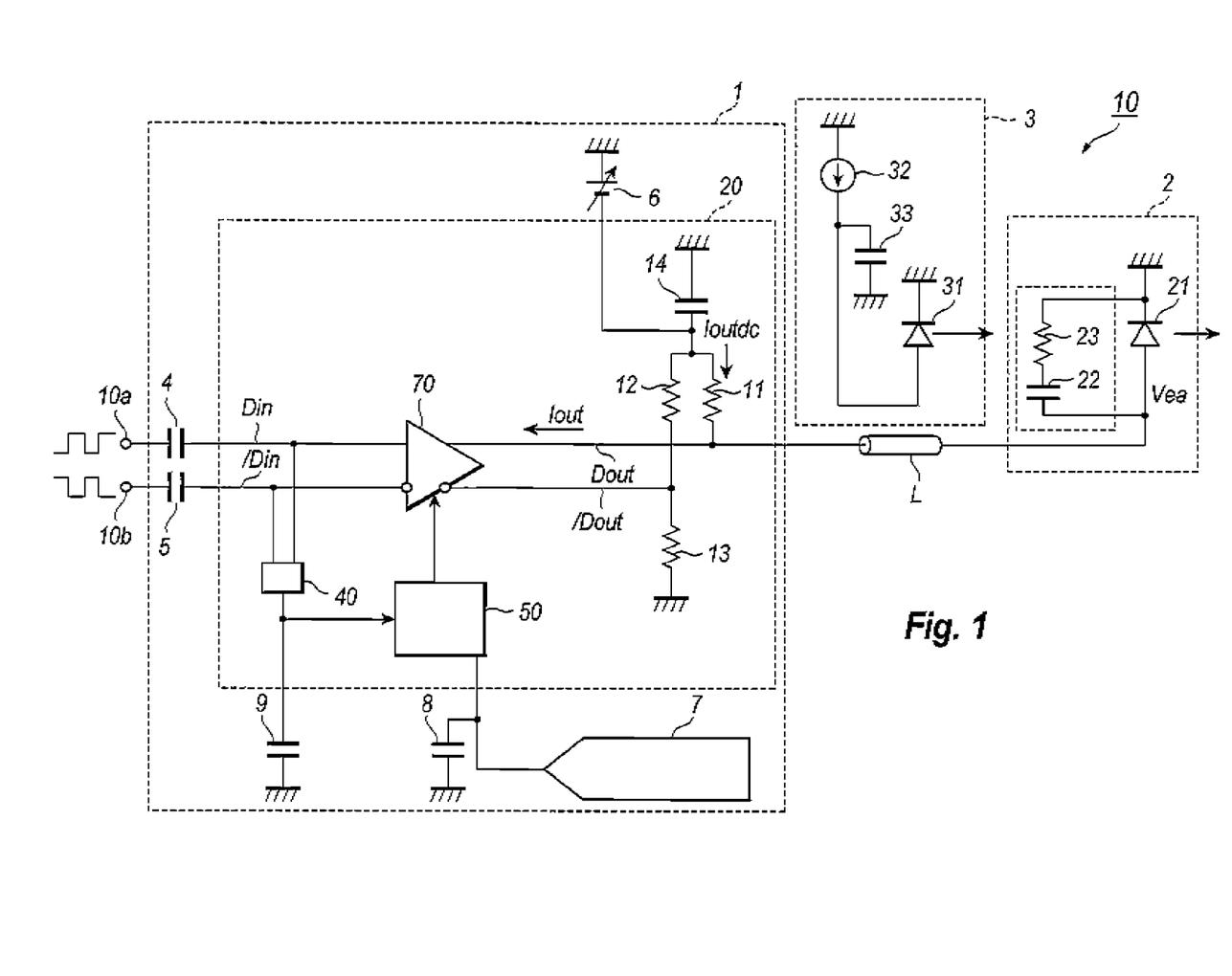
FIG. 1 is a circuit diagram of an optical transmitter of one embodiment of the present application.

FIG. 1 is a circuit diagram of a transmitter optical module of the first embodiment. The transmitter optical module 10, which is applicable to the optical communication system, includes input terminals, 10a and 10b, each receiving modulation signals complementary to each other and connected to the inputs, Din and /Din of the EA driver 20. In the present specification, the symbol slash "/" means that a signal with the slash has a phase opposite to that of the signal denoted by the symbol without the slash; that is, two signals, one with the slash and the other without the slash, are differential and complementary to each other. The transmitter optical module 10 outputs an optical signal modulated by the modulation signals, and primarily comprises a driver unit 1, a modulator unit 2, and a source unit 3.

The driver unit 1 includes a EA driver 20, two coupling capacitors, 4 and 5, a bias source 6, an offset source 7, and two bypassing capacitors, 8 and 9. The coupling capacitors, 4 and 5, which are connected between each of the input terminals, 10a and 10b, and the EA driver 20 respectively, pass only AC components contained in the modulation signals. The EA driver 20, which drives the EA modulator device 21 in the modulator unit 2, has a function to adjust the cross-point of the outputs, Dout and /Dout, which are output from the driver circuit 70. The EA driver 20 includes a signal detector 40, an offset controller 50, the driver circuit 70, two pull-up resistors, 11 and 12, a pull-down resistor 13, and a bypassing capacitor 14.

The signal detector 40, which is coupled with the input terminals, 10a and 10b, through the coupling capacitors, 4 and 5, detects the existence of the modulation signals. The signal detector 40 provides the existence of the modulation signal as a control signal to the offset controller 50. Details of the signal detector 40 will be described later.

The offset controller 50, by receiving the control signal from the signal detector 40 and an offset signal from the offset source 7, adjusts the offset of the outputs, Dout and /Dout, of the driver circuit 70. Two signals, namely, the control signal and the offset signal are provided to the offset controller 50 by putting respective bypassing capacitors, 8 and 9. The output of the offset controller 50 is provided to the driver circuit 70. Details of the offset controller 50 will be also described later in the present specification.

The driver circuit 70 receives two inputs, Din and /Din, and generates two outputs, Dout and /Dout. Also, the driver circuit 70 receives the control signal provided from the offset controller 50. Both outputs, Dout and /Dout, of the driver circuit 70 are pulled up to the bias source 6 through respective pull-up resistors, 11 and 12. One of the outputs /Dout is pulled down to the ground by the pull-down resistor 13. Two resistors, 12 and 13, collectively operate as a terminator for the output /Dout. These pull-up and pull-down resistors, 11 to 13, have resistance about 50Ω, namely, the terminator composed by two resistors, 12 and 13, has the resistance of 25 Ω.

When the modulation signal exist in the inputs, Din and /Din, which means that the output signals appear in the outputs, Dout and /Dout, of the driver circuit 70; the current output Iout is absorbed by the driver circuit 70 flowing from the bias source 6 through the pull-up resistor, 11. The control signal provided from the offset controller 50 adjusts the magnitude of the current output Iout. Because the output DC level of the driver circuit 70 primarily determined by the voltage drop occurring in the pull-up resistor 11, the control signal may adjust the output DC level of the output Dout. A situation same with the output Dout may be reflected in the other output /Dout. That is, the control signal provided from the offset controller 50 may adjust the DC level of the other output /Dout.

The bias source 6 provides the bias Vbias to the EA (modulator) device 21 and the outputs, Dout and /Dout, of the driver circuit 70 through the pull-up resistors, 11 and 12. The offset source 7 determines the offsets of the outputs, Dout and /Dout, of the driver circuit 70. The offset source 7 outputs the offset signal to the offset controller 50. The capacitor 8 is a bypassing capacitor to bypass high frequency components contained in the offset signal output from the offset source 7. The capacitor 8, combined with output impedance of the offset source 7, constitutes a low-pass filter with a cut-off frequency of about 20 kHz.

The modulator unit 2 receives the output Dout of the EA driver 20 through the transmission line L. The modulator unit 2 modulates light with the continuous wave (CW) coming from the source unit 3 based on the output Dout and generates modulated light. The modulator unit 2 includes the EA device 21, a capacitor 22, and a resistor 23. The EA device 21 may be a type of the electro-absorption (EA) modulator. The EA device 21 receives the output Dout from the transmission line L in the anode thereof; while, the cathode thereof is grounded. The capacitor 22 and the resistor 23 constitute a filter connected in parallel to the EA device 21 in order to compensate high frequency performances of the EA device 21.

The source unit 3 generates the CW light provided to the modulator unit 2. The source unit 3 includes a light-emitting device 31, a current source 32, and a capacitor 33. The light-emitting device 31 may be a type of the distributed feed-back (DFB) semiconductor laser diode (LD), which is hereafter denoted as DFB-LD. The anode of the DFB-LD 31 receives the current provided from the current source 32; while, the cathode thereof is grounded. The capacitor 33 is also a type of the bypassing capacitor to bypass high frequency signals to the ground.

Next, details of the signal detector 40 will be described as referring to FIG. 2A, which is a circuit diagram of one example of the signal detector 40. The signal detector 40 of the present embodiment includes two resistors, 41 and 42, three transistors, 43 to 45, two current sources, 46 and 48, a capacitor 47, and a comparator 49. Two resistors, 41 and 42, which are put between two input terminals, 40a and 40b, have resistance of about 1 kΩ, while, the rest resistor also has resistance of about 1 kΩ.

Three transistors, 43 to 45, may be a type of the npn-bipolar transistor. Bases of the transistors, 43 and 44, are connected to the input terminals, 40a and 40b; while, the base of the rest transistor 45 is connected to a node between the resistors, 41 and 42. Collectors of the transistors, 43 to 45, are grounded, while, the emitters of two transistors, 43 and 44, are commonly connected to the current source 46, while, the emitter of the rest transistor 45 is pulled down by the other current source 48. That is, these transistors, 43 to 45, have the configuration of the emitter follower. The emitters of the transistors, 43 and 44, are commonly input to the inverting input of the comparator 49, while, the emitter of the rest transistor 45 is provided to the non-inverting input of the comparator 49. The output of the signal detector 40 is provided from the output of the comparator 49 in the output terminal 40c.

In the signal detector 40, a peak level of one of two inputs, Din and /Din, is detected by the transistors, 43 and 44, and provided to the inverting input of the comparator 49 as a signal Vph. That is, two transistors, 43 and 44, show the function of the full wave rectification. On the other hand, an average of the inputs, Din and /Din, is detected by the rest transistor 45 through respective resistors, 41 and 42, and provided to the non-inverting input of the comparator 49 as another signal Vave. In the present embodiment, two inputs for the comparator 49 are intentionally set an offset Voff, because when the modulation signals completely disappear, the signals Vph and Vave both become zero, which brings an erroneous operation in the comparator 49. When the former, the peak level Vph, becomes greater than the average Vave added with the offset Voff, namely Vave+Voff, the comparator 49 resets the output thereof to select the first offset level in the offset controller 50; while, when the peak level Vph is less than the level Vave+Voff, the comparator 49 sets the output thereof to select the second offset level in the offset controller 50. The offset Voff is preferably set to be a half of the minimum amplitude of the modulation signal. Specifically, when the minimum signal level to be detected by the signal detector 40 is set to be 0.2 Vp-p, the offset Voff is set to be 0.1 V. FIG. 2B is a circuit diagram to generate the offset Voff shown in FIG. 2A. The circuit includes a transistor 45A of the pnp-bipolar transistor, two resistors, 45B and 45C, and a current source 45D. Thus, the circuit operates as an emitter follower. The output of the circuit is pulled out from a node between two resistors, 45B and 45C. Accordingly, the output level of the circuit is raised from the average level Vave by a forward junction voltage between the emitter-base of the transistor 45A and the voltage drop caused in the resistor 45B by the current determined by the current source 45D. Because the transistor 45 inherently has the forward junction voltage between the base-emitter thereof, the emitter level of the transistor 45, which is provided to the non-inverting input of the comparator 49, is lowered by the forward junction voltage from the base level thereof, namely, the output of the circuit shown in FIG. 2B. Thus, the forward junction voltage of two transistors, 45A and 45, may be compensated, and the level of the non-inverting input is raised from the average Vave by the voltage drop caused in the resistor 45B.

Figure 3:
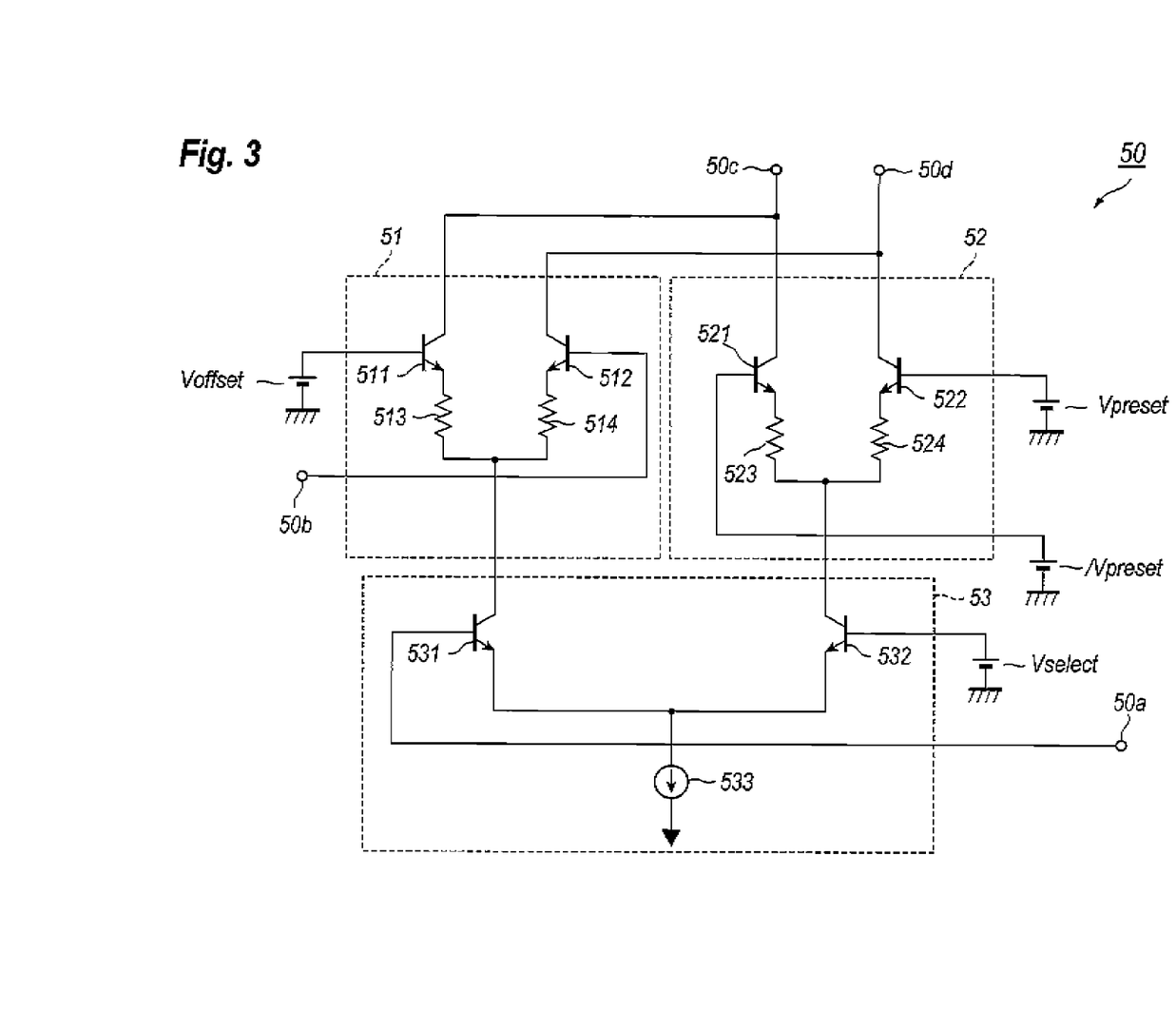
FIG. 3 is a circuit diagram of an example of the offset controller.

The offset controller 50 will be described in detail. FIG. 3 is a circuit diagram of the offset controller 50 of an embodiment. The offset controller 50 includes an offset generator 51, a preset generator 52, a selector 53, and four voltage references, Voffset, Vpreset, /Vpreset, and Vselect.

The offset generator 51 determines the first offset level in the output Dout of the driver circuit 70, namely, adjusts the cross-point of the output Dout, where the first offset level depends on the offset source 7 connected to the input terminal 50b. The offset generator 51 includes a pair of transistors, 511 and 512, whose bases receive the offset reference Voffset and the output of the offset source 7 through the input terminal 50b, respectively. The collectors of the transistors, 511 and 512, are connected to the output terminals, 50c and 50d; and the emitters are commonly connected to the selector 53.

The preset generator 52 provides, to the output Dout of the driver circuit 70, the second offset level determined by the references, Vpreset and /Vpreset, in order to adjust the cross point of the output Dout of the driver circuit 70. The preset generator 52 includes a pair of transistors, 521 and 522 that receive in the bases thereof the references, Vpreset and /Vpreset; while, the emitters are commonly connected to the selector 53. The collectors of the paired transistors, 521 and 522, are guided to the outputs, 50c and 50d, to provide the second offset level to the driver circuit 70.

The selector 53 selects, depending on the control signal provided to the input terminal 50a from the signal detector 40, one of the outputs of the offset generator 51 and the preset generator 52. The selector 53 also includes a pair of transistors, 531 and 532, whose bases receive the control signal provided from the signal detector 40 and selector reference Vselect, respectively. The emitters of two transistors, 531 and 532, are commonly connected to the current source 533. The collectors of the transistors, 531 and 532, are connected to the offset generator 51 and the preset generator 52, respectively. Thus, the selector 53 constitutes a differential circuit of two transistors, 531 and 532. When the control signal provided to the input terminal 50a exceeds the selector reference Vselect, the selector 53 selects the offset generator 51, while, the control signal is lower than the selector reference Vselect, the selector 53 selects the preset generator 52.

The offset reference Voffset, which determines the base level of the transistor 511 in the offset generator 51 is set to be about −2.2 V. The preset reference Vpreset determines the base bias of the transistor 522 in the preset generator 52, while, the other preset reference /Vpreset determines the base bias of the other transistor 521. The present embodiment sets the preset reference Vpreset to be about −2.2 V. The other preset reference /Vpreset determines the base level of the transistor 521, which is also set to be about −2.2 V in the embodiment shown in FIG. 3. That is, the offset controller 50 of the present embodiment, when the signal detector 40 detects the absence of the modulation signal, absorbs the current whose magnitude is about a half of that attributed to the current source 533. The selector reference Vselect determines the base level of the transistor 532, and is set to be about −3.2 V in the present embodiment.

When the control signal appearing in the input terminal 50a exceeds the selector reference Vselect, the selector 53 turns on the transistor 531 but turns off the other transistor 532 to select the offset generator 51; while, the control signal becomes less than the selector reference Vselect, the selector 53 turns off the transistor 531 but turns on the other transistor 532 to select the preset generator 52. As described later, the outputs of the offset controller 50 are connected to the driver circuit 70 so as to shunt the currents flowing in the pull-up resistors, 11 and 12, or the load resistors, 75 and 76. Accordingly, the magnitude of the offset controlled by the offset controller 50 depends on the magnitude of the currents absorbed through the output terminals, 50c and 50d. Moreover, the balance between the offsets appearing in respective outputs, Dout and /Dout, is determined by the balance of the currents each flowing in the transistors, 511 and 512, in the offset generator 51 and the currents flowing in the transistors, 521 and 522, in the preset generator 52. That is, the base biases in the unevenness and the difference therebetween determines the magnitude of the adjusted offset.

Figure 4:
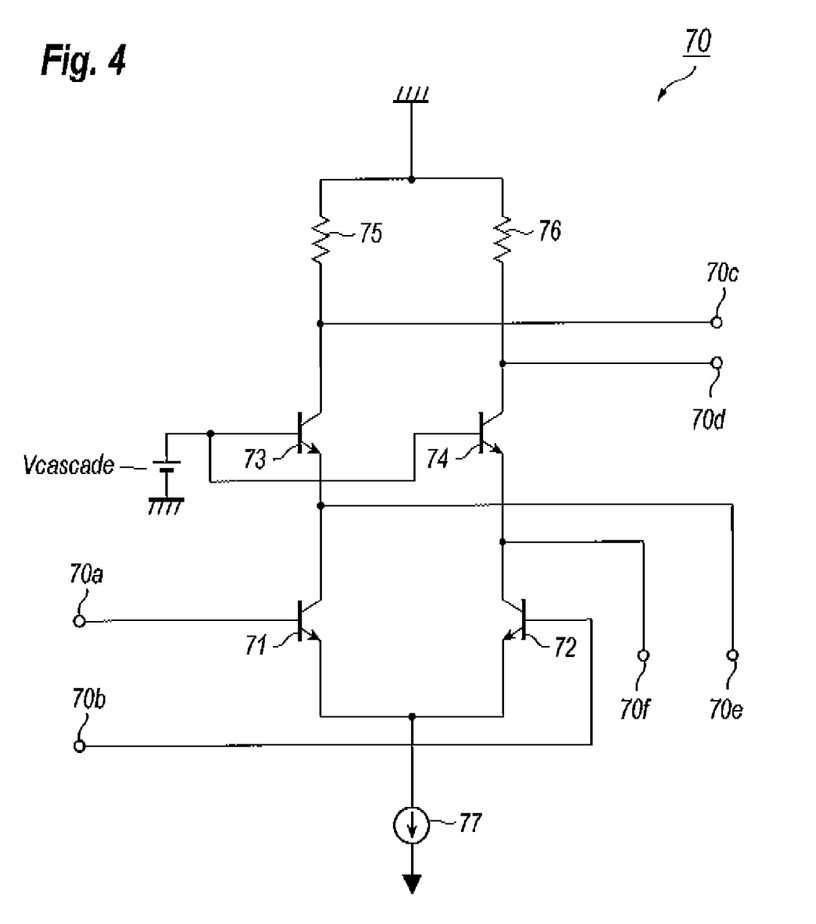
FIG. 4 is a circuit diagram of an example of the driver circuit.

Next, the driver circuit 70 will be described. FIG. 4 is a circuit diagram of an example of the driver circuit 70 that includes a pair of transistors, 71 and 72, a pair of cascade transistors, 73 and 74, a pair of load resistors, 75 and 76, a current source 77, and a cascade reference Vcascade. Transistors, 71 to 74, are the type of the npn-bipolar transistor. Two transistors, 71 and 72, receive the modulation signals in the bases thereof through the input terminals, 70a and 70b. The collectors of the transistors, 71 and 72, are grounded through respective cascade transistors, 73 and 74, and the load resistors, 75 and 76; while, the emitters thereof are commonly connected to the current source 77. The cascade transistors, 73 and 74, which are fixedly biased in the bases thereof by the cascade reference Vcascade, are put between the paired transistors, 71 and 72, and the load resistors, 75 and 76. Thus, the driver circuit 70 operates as a differential circuit to amplify a difference between the modulation signals provided to the input terminals, 70a and 70b.

The outputs, 70c and 70d, of the driver circuit 70 are brought out from respective load resistors, 75 and 76, where these load resistors, 75 and 76, have resistance of, for instance, about 50Ω; but the resistance depends on the current determined by the current source 77, and the size of the paired transistors, 71 and 72. The bases of the cascade transistors, 73 and 74, are fixed to be about −1.2 V by the cascade reference Vcascade in the embodiment shown in FIG. 4.

Figure 5A:
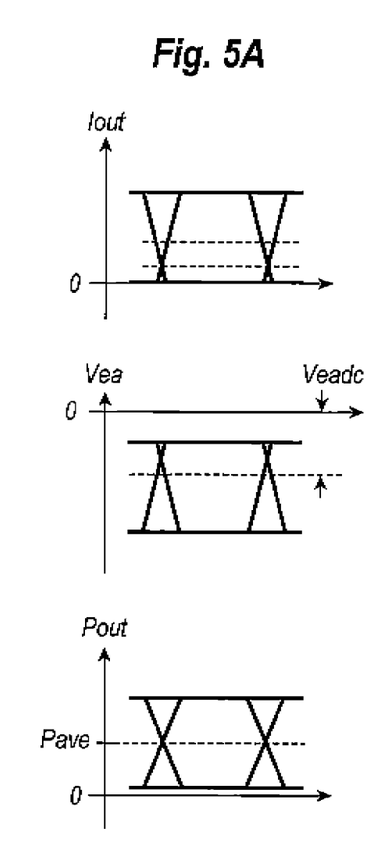
FIGS. 5A to 5C show behaviors of the output current of the driver circuit, the output voltage applied to the EA modulator device, and the optical output power derived from the EA modulator device.
Figure 5B:
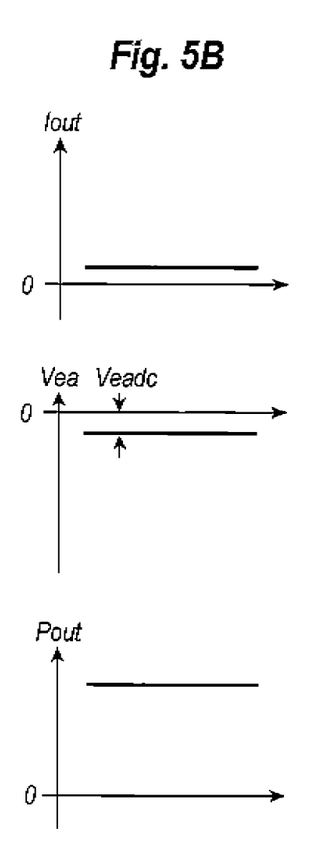
Figure 5C:
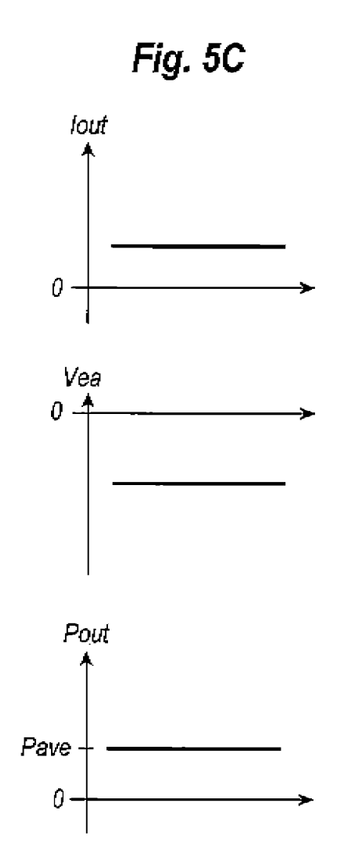

The operation to adjust the cross point appearing in the output of the driver circuit 70 will be described. Table below lists parameters of the EA driver 20 when the modulation signal exists or disappear; while, FIGS. 5A to 5C show transitions of the output current Tout, the output voltage Vea, and the optical output power Pout from a state where the modulation signal exists to another state where the modulation signal disappears.

TABLE 1

| parameter | modulation signal | | |
| --- | --- | --- | --- |
| | ON | OFF (no adjust) | OFF (with adjust) |
| Rout (Ω) | 50 | 50 | 50 |
| Ioutp-p (mA) | 80 | 80 | 80 |
| Cross point Iout (%) | 15 | 15 | 45 |
| Ioutdc in Iout (%) | 45 | 15 | 45 |
| Ioutdc (mA) | 36 | 12 | 36 |
| Vbias (V) | −0.5 | −0.5 | −0.5 |
| Veadc (V) | −2.3 | −1.1 | −2.3 |

When the modulation signal exists, the offset controller 50 controls the driver circuit 70 such that the driver circuit 70 outputs the voltage Vea with a cross point shifting toward HIGH level, or the current Iout with a cross point shifting toward the LOW level, in order to adjust the cross point of the optical output Pout in the center between HIGH and LOW optical levels. Under such an offset condition, the disappearance of the modulation signal induces the reduction of the current Tout absorbing into the driver circuit 70, which lowers the voltage drop in the pull-up resistor 11 and makes the output voltage Vea substantially equal to the bias Vbias provided from the bias source 6. The output voltage Vea in the level thereof is greater than the cross point when the modulation signal exists, which means that the optical power Pout output from the transmitter optical module 1 exceeds the average output power Pave when the modulation signal exists, that is, the transmitter optical module 1 falls in a state of the excessive output power.

The reason why the EA device 21 outputs the light with excessive optical power will be described. When the modulation signal exists, the driver circuit 70 in the output Dout thereof absorbs the current Tout having a DC component Ioutdc thereof flowing in the resistor 11. Assuming the resistance of the resistor 11 to be Rout; the DC component of the voltage Vea becomes:

$$Veadc = -Ioutdc \times Rout + Vbias \quad (1)$$

The DC component Ioutdc of the current Tout for the no modulation signal becomes equal to a value corresponding to the cross point of the current Tout when the modulation signal exists. In other words, under the condition of no modulation signal, the DC component Ioutdc becomes equal to a time average of the output current Tout. Accordingly, even the output voltage Vea, or the output current Tout, has the cross point shifted from the center between two levels of HIGH and LOW, the DC component Ioutdc of the output current Tout does not extremely deviate from the center between two levels.

Assuming that respective circuit elements around the output of the driver circuit 70 have those shown in FIG. 4; the DC component Veadc of the output voltage Vea is simulated. In the calculation, the cross point of X % means that, assuming the full width between the HIGH and LOW levels to be 100%, the cross point locates on X % measured from the LOW level.

In the simulation shown in table above, the DC component Ioutdc of the output current Iout, namely, the cross point thereof, becomes about 15% under the condition of no modulation signal, while, under the existence of the modulation signal, the cross point becomes about 45% which slightly depends on the data pattern of the modulation signal. Based on equation (1) above described, the DC component Veadc of the output voltage Vea is set to be −2.3 V under the existence of the modulation signal, while, it becomes only −1.1 V under the absence of the modulation signal. Thus, the DC component Veadc of the output voltage Vea is set to be higher under the absence of the modulation signal compared with the condition of the existence of the modulation signal. The higher output voltage Vea results in the greater optical output power because the EA device 21 shows transparency at a shallower reverse bias. Thus, the DC level Veadc of the voltage output Vea becomes higher under the condition of the absence of the modulation signal compared with the other condition of the existence of the modulation signal, which means that the EA device 21 excessively outputs the light when the modulation signal is absent.

The transmitter optical module 10, in particular, the EA driver 20 thereof provides the signal detector 40 that detects the existence, or the absence, of the modulation signal. When the signal detector 40 detects the absence of the modulation signal, the offset controller 50 provides the control signal to the driver circuit 70, where the control signal forces the cross point of the output current Tout to be, for instance, 45% of the full width between the HIGH and LOW levels. Then, the DC component Veadc of the output voltage Vea becomes −2.3 V, which is comparable to that when the modulation signal exists. The excessive emission of the optical transmitter 10 may be effectively prevented.

The offset controller 50 forces the selector 53 to select one of the offset generator 51 and the preset generator 52. The selection is based on the control signal provided from the signal detector 40. The selector 53, in particular, paired transistors, 531 and 532, in the selector 53 operate in the saturation mode; accordingly, noises caused by the signal detector 40 may be effectively prevented from being transferred to the driver circuit 70. Even the signal detector 40 operates in high frequencies; the signal detector 40 does not behave as a jitter source.

The preset generator 52, by receiving biases, Vpreset and /Vpreset, in respective transistors, 521 and 522, sets the offset in the output Dout of the driver circuit 70 so as not to cause the excessive optical output in the transmitter optical module 10. The offset controller 50 instantaneously switches the offset generator 51 to the preset generator 52 when the signal detector 40 detects the absence of the modulation signal.

The instability of the cross point causes a jitter in the optical output of the transmitter optical module 10 in frequencies from 20 kHz to 20 GHz. Because the transmitter optical module 10 provides the bypassing capacitor 8 in the output of the preset source 7, which stabilizes the cross point even in frequencies around 20 kHz. When the signal detector 40 detects the existence of the modulation signal, the selector 53 instantaneously switches the preset generator 52 from the offset generator 51, which adjusts the cross point of the output Dout of the driver circuit 70. Because the bypassing capacitors, 8 and 9, are put in the inputs of the offset controller 50, the output of the offset controller 50 may be instantaneously changed without substantial delays attributed to the bypassing capacitors, 8 and 9. This means that the excessive optical output power from the transmitter optical module 10 may be effectively prevented even in an instant period.

In the embodiment thus described, the offset controller 50 includes the preset generator 52 whose base biases are integrally built therein as the references, Vpreset and /Vpreset. However, at least one of the references, Vpreset and /Vpreset, may be extracted from the offset controller 50 as those of the offset source 7 for the offset generator 51. Such an arrangement of the offset controller 50, in particular, the preset generator 52 may enhance the flexibility to set the offset when the modulation signal becomes absent.

Second Embodiment

Figure 6:
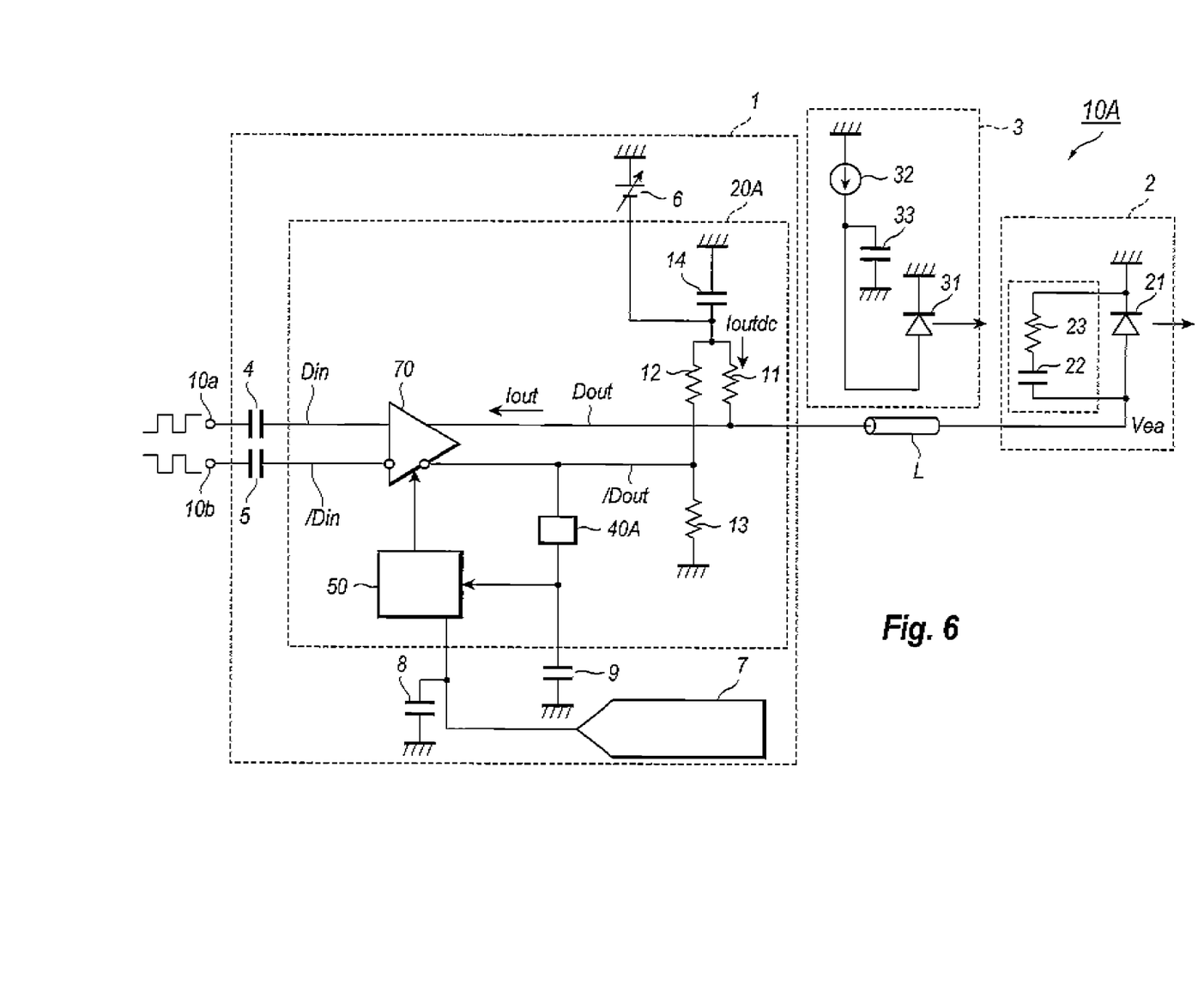
FIG. 6 is a circuit diagram of an optical transmitter according to the second embodiment of the application.

FIG. 6 is a circuit diagram of the transmitter optical module 10A of one modified embodiment of the present application. The transmitter optical module 10A has a feature that the signal detector 40A in the EA driver 20A detects the existence of the output /Dout of the driver circuit 70.

The signal detector 40A of the present embodiment receives the output /Dout of the driver circuit 70. Other arrangements of the transmitter optical module 10A are the same as those of the aforementioned transmitter optical module 10.

Figure 2A:
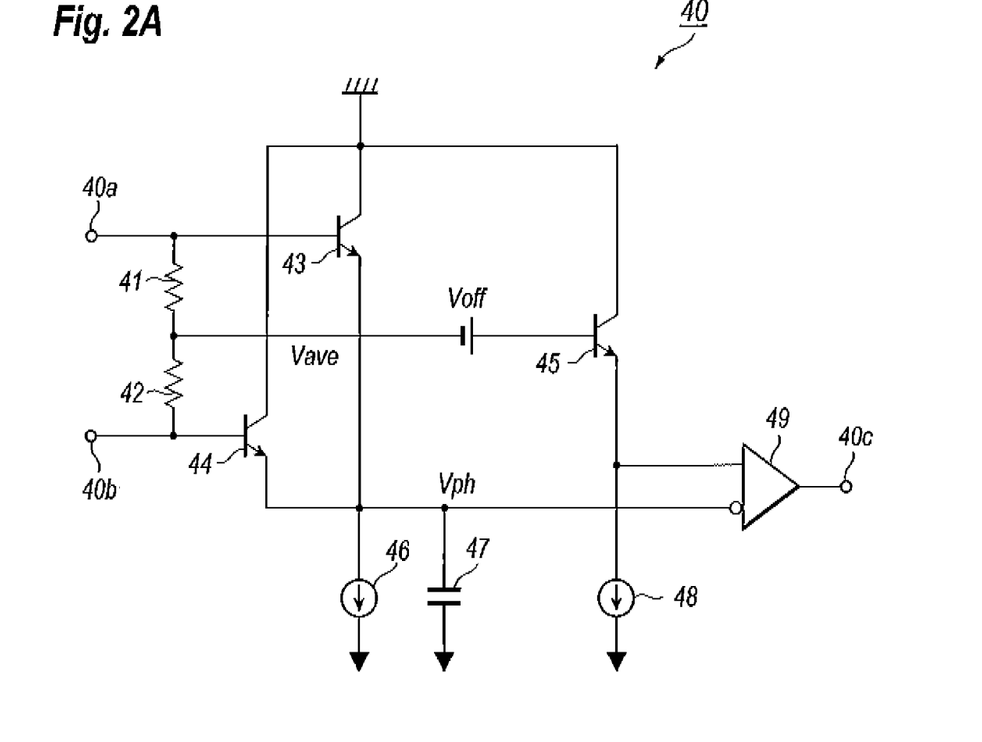
FIG. 2A is a circuit diagram of an example of the signal detector.
Figure 2B:
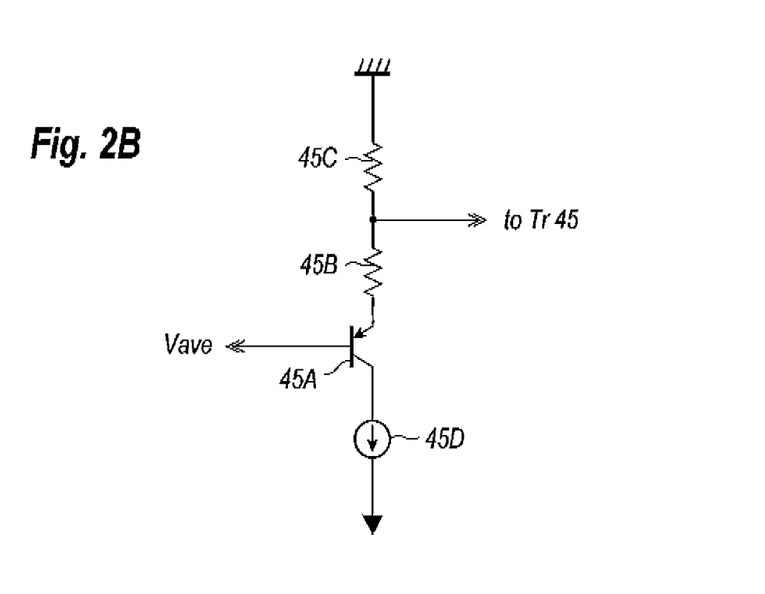
FIG. 2B is a circuit diagram to generate an offset Voff for the average Vave in FIG. 2A.
Figure 7:
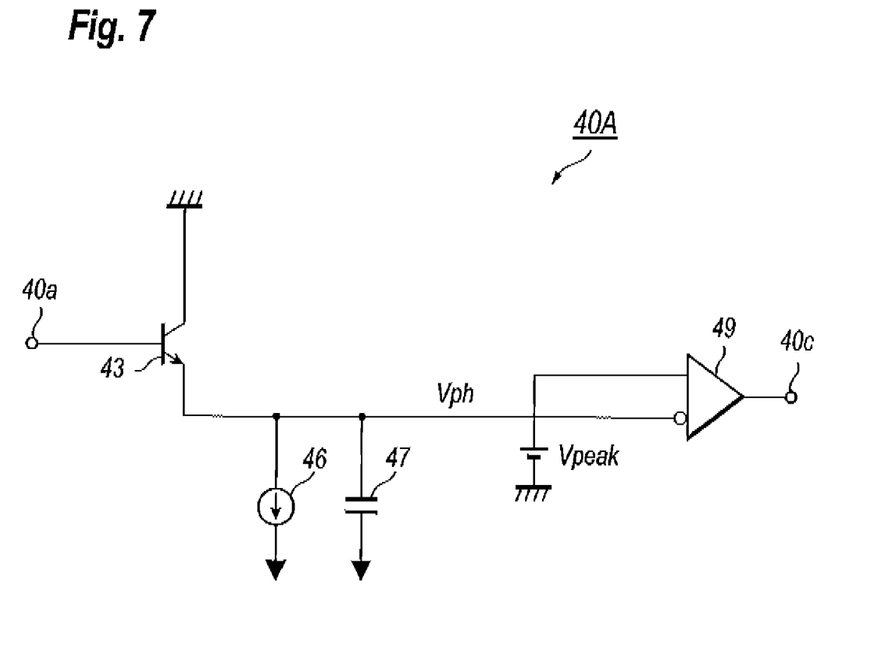
FIG. 7 is a circuit diagram of the signal detector implemented within the optical transmitter shown in FIG. 6.

FIG. 7 is a circuit diagram of the modified signal detector 40A which removes, from the circuit shown in FIG. 2, two resistors, 41 and 42, two transistors, 44 and 45, and the current source 48, because the arrangement of the modified transmitter optical module 10A is unnecessary to detect signals differentially or complementarily. The transistor 43 in the modified signal detector 40A and the capacitor 47 constitute the peak hold circuit that holds the peak voltage of the output /Dout of the driver circuit 70 and transfers this peak value to the comparator 49 as a signal Vph.

The peak reference Vpeak provides a reference level against the peak value Vph to the comparator 49. The peak reference Vpeak is preferably set in a midway between the HIGH level and the cross point of the output /Dout of the driver circuit 70, practically, the peak reference Vpeak is set to be about −3 V. The output of the comparator 49 is provided to the offset controller 50 through the terminal 40c.

When the peak level, exactly, the peak hold level Vph exceeds the peak reference Vpeak, the comparator 49 sets the output thereof, which means that the offset controller 50 selects the offset generator 51 by the selector 53. Oppositely, when the peak hold level Vph of the output /Dout becomes less than the peak reference Vpeak; the comparator 49 resets the output thereof to select the preset generator 52 in the offset controller 50.

Figure 8A:
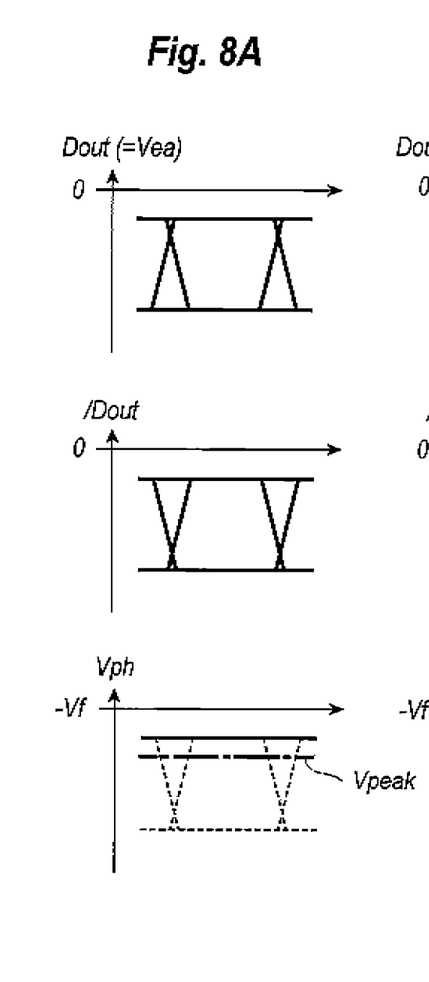
FIGS. 8A to 8C show behaviors of the output voltage applied to the EA modulator device, the output voltage with a phase opposite to that shown in FIG. 8A and detected by the signal detector, and the peak hold level of the signal detector when the modulation signal exits, that disappears but the compensation of the offset is not carried out, and that disappears and the offset compensation is carried out.
Figure 8B:
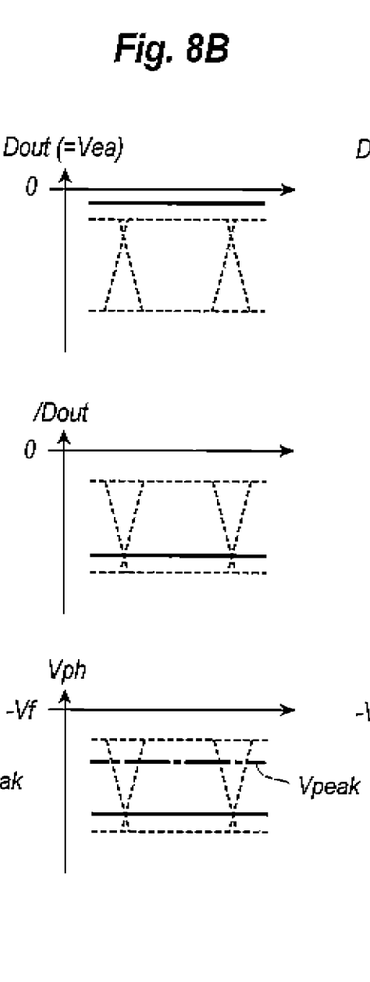
Figure 8C:
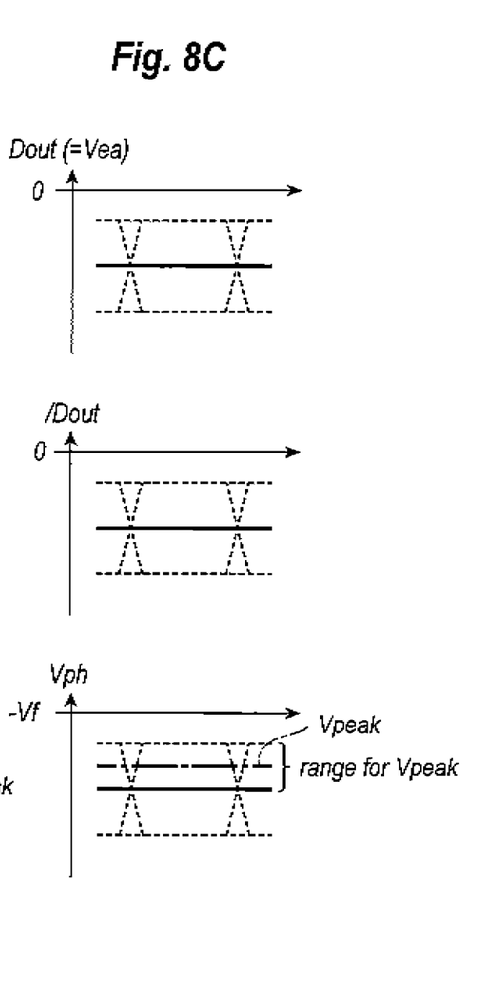

The adjustment of the cross point of the outputs, Dout and /Dout, of the EA driver 20A will be described. FIG. 8A shows statuses of the outputs, Dout and /Dout, and the peak hold level Vph when the modulation signal exists, which means that the output /Dout exists. FIG. 8B shows statuses of the outputs, Dout and /Dout, and the peak hold level Vph when the output /Dout disappears and the offset controller 50 is assumed to keep the selection of the offset generator 51. While, FIG. 8C shows statuses when the modulation signal disappears but the offset controller 50 selects the preset generator 52.

When the modulation signal exists as shown in FIG. 8A, the peak level Vph closes or becomes substantially equal to HIGH level of the output /Dout. Then, the peak level Vph exceeds the peak reference Vpeak; the signal detector 40A outputs the control signal to the offset controller 50 to select the offset generator 51. The offset controller 50 provides additional currents in the outputs, Dout and /Dout, of the driver circuit 70. The additional currents in the unevenness and the difference thereof may be determined by the biases supplied to the bases of the transistors, 511 and 512, of the offset generator 51, one of which is provided from the offset source 7. Because the additional currents flows in the load resistors, 75 and 76, of the driver circuit 70, the offsets of the outputs, Dout and /Dout, may be adjusted. Specifically, the cross point of the output Dout is adjusted to be about 85% measured from the LOW level with respect to the full difference between the HIGH and LOW levels.

The status shown in FIG. 8B corresponds to the absence of the modulation signal. Under the absence of the modulation signal, the outputs, Dout and /Dout, of the driver circuit 70 disappear, exactly, the output Dout is set higher than the HIGH level and the LOW level, respectively, because the DC current supplied from the bias source 6 reduces. Then, the peak hold level Vph lowers, namely, becomes lower than the peak reference Vpeak, and the signal detector 40A resets the output thereof so as to select the preset generator 52 by the selector 53 in the offset controller 50. Under such a state, the output Dout becomes higher than the average thereof, or equivalently, the cross point level, the transmitter optical module 10A outputs light with excessive power. However, just after the offset controller 50 selects the preset generator 52, the excessive power of the output light may be compensated.

After the offset controller 50 selects the preset generator 52, the outputs, Dout and /Dout, of the driver circuit 70 are set to be substantially equal to the cross point when the modulation signal exists. Because the peak hold Vph is lower than the peak reference Vpeak even the offset controller 50 selects the preset generator 52, the signal detector 40A keeps the output thereof to select the preset generator 52. When the modulation signal appears, the peak hold Vph rises and becomes higher than the peak reference Vpeak, the signal detector 40A sets the output thereof to select the offset generator 51 in the offset controller 50.

Because the peak reference Vpeak in the magnitude thereof is set independent of the switching, but depends solely on the existence of the modulation signal; the selection by the selector 53 in the offset controller 50 may be stably operated.

According to the transmitter optical module 10A, the signal detector 40A is coupled with the output /Dout of the driver circuit 70. While, the aforementioned transmitter optical module 10 provides the signal detector 40 in the front end of the EA driver 20, which possibly affect the high frequency performance of the transmitter optical module 10 by input capacitance of the signal detector 40. The signal detector 40A set in the downstream of the driver circuit 70 causes substantially no influence in the high frequency performance of the EA driver 20.

Third Embodiment

Figure 9:
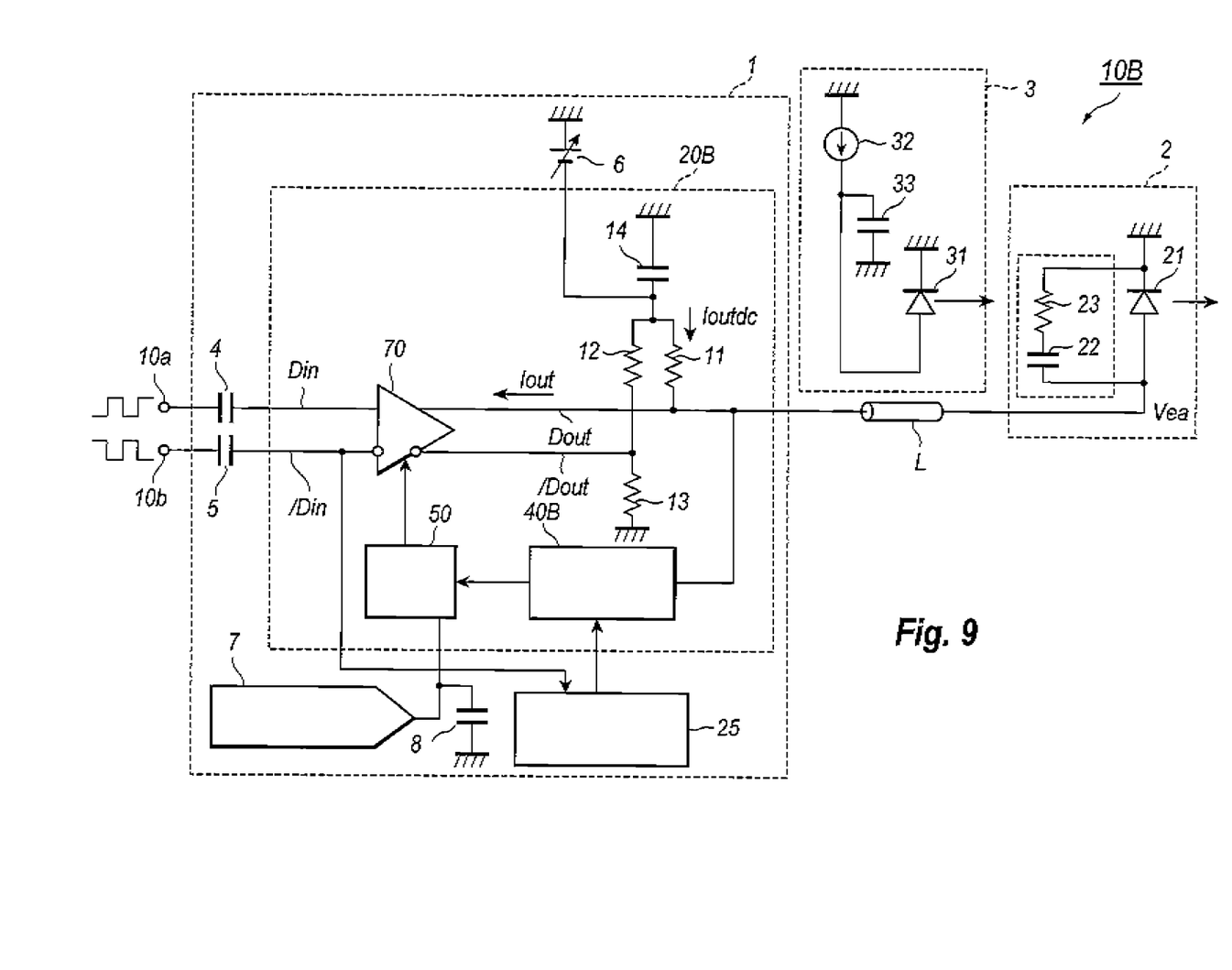
FIG. 9 is a circuit diagram of an optical transmitter of a still another embodiment of the present application.

FIG. 9 is a circuit diagram of a transmitter optical module according to the third embodiment of the present application. The transmitter optical module 10B has a feature that the transmitter optical module 10B provides another signal detector 40B in the EA driver 20B and an average adjustor 25 connected to the signal detector 40B.

The signal detector 40B of the present embodiment, different from the aforementioned detector 40A, detects the existence of the modulation signal at the output Dout of the driver circuit 70 not the output /Dout thereof. The signal detector 40B provides to the offset controller 50 the control signal whose status depends on the existence of the modulation signal.

Figure 10A:
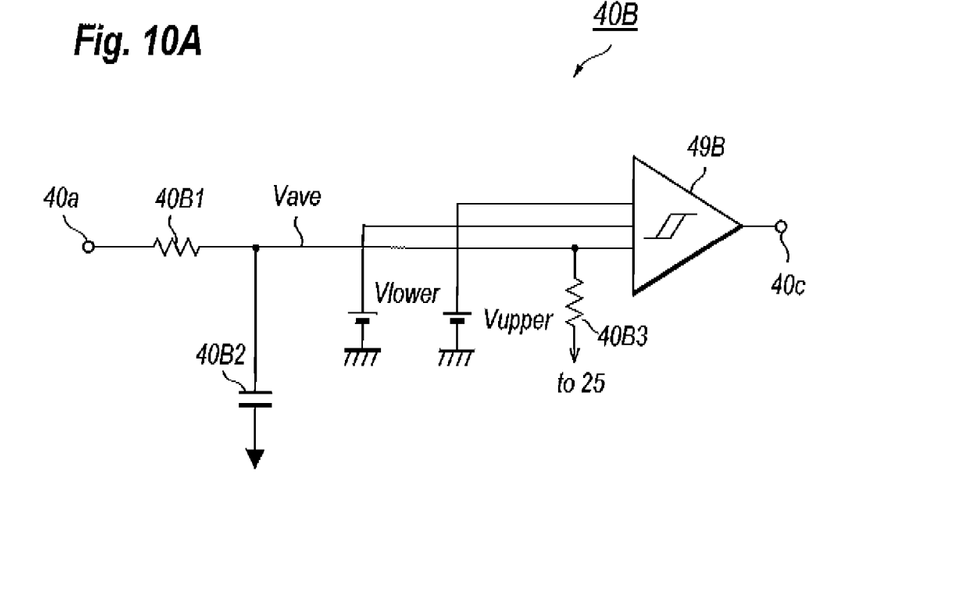
FIG. 10A is a circuit diagram of an example of the signal detector implemented within the optical transmitter shown in FIG. 9.

FIG. 10A is a circuit diagram of an example of the signal detector 40B of the present embodiment, which includes a resistor 40B1, a capacitor 40B2, two references, Vupper and Vlower, and a hysteresis comparator 49B. The resistor 40B1 and the capacitor 40B2, which are put between the input terminal 40a and the hysteresis comparator 49B, constitute an integrator circuit (high-cut filter) to reduce high frequency components contained in the output Dout of the driver circuit 70. The output of the resistor 40B1 corresponds to the average Vave of the output Dout.

Two references, Vupper and Vlower, determine the hysteresis characteristic of the comparator 49B, namely, the former reference Vupper gives the leading threshold, while, the latter reference Vlower determines the falling threshold. Specifically, when the input Vave exceeds the leading threshold Vupper, the comparator 49B sets the output thereof, while, the input Vave becomes less than the falling threshold, the comparator 49B resets the output. In the present embodiment, the former reference Vupper is set higher than the average of the output Dout and concurrently higher than a center value of the eye diagram of the output Dout, specifically, the upper reference Vupper is set to be about −0.8V. On the other hand, the latter reference Vlower is preferably set lower than the center of the eye diagram of the output Dout, specifically, the lower reference Vlower is set to be about −3.3 V.

The signal detector 40B provides to the offset controller 50 the control signal to select the preset generator 52 when the average Vave of the output Dout exceeds the upper reference Vupper, while, the signal detector 40B provides to the offset controller 50 the control signal to select the offset generator 51 when the average Vave becomes lower than the reference Vlower under the condition where the average Vave once exceeds the other reference Vupper.

Figure 10B:
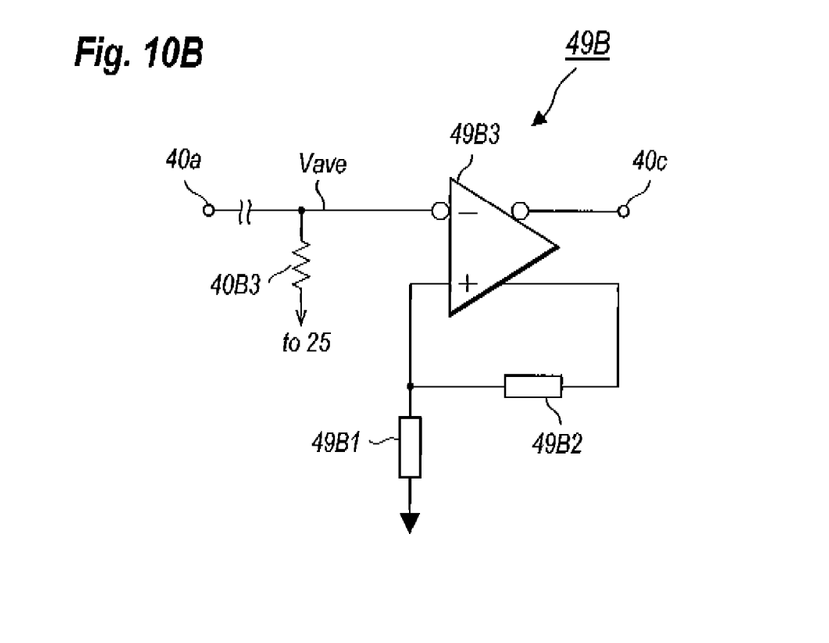
FIG. 10B is a circuit diagram of an example of a hysteresis comparator implemented within the signal detector shown in FIG. 10A.

FIG. 10B shows an example of the hysteresis comparator 49B which includes a differential amplifier 49B3 having two inputs and two outputs, and two resistors, 49B1 and 49B2. Two references, Vupper and Vlower, may be determined by the HIGH and LOW levels of the output of the differential amplifier 49B3 and the ratio of the resistance of two resistors, 49B1 and 49B2.

The average adjustor 25 sets the average Vave lower than the upper reference Vupper when the modulation single exists. When the appearance of the modulation signal is detected by the signal detector 40B, the average adjustor 25 forcibly sets the average Vave of the output Dout lower than the lower reference Vlower.

Figure 11A:
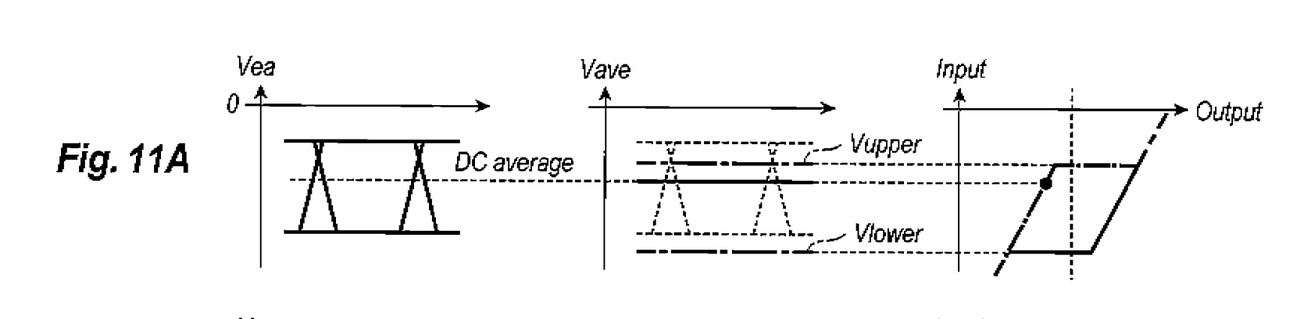
FIGS. 11A to 11C show transitions of respective parameters of the optical transmitter shown in FIG. 9 from an ordinary state with the existence of the modulation signal, a state in the absence of the modulation signal, and a state in the absence of the modulation signal but the correction of the offset is carried out.
Figure 11B:
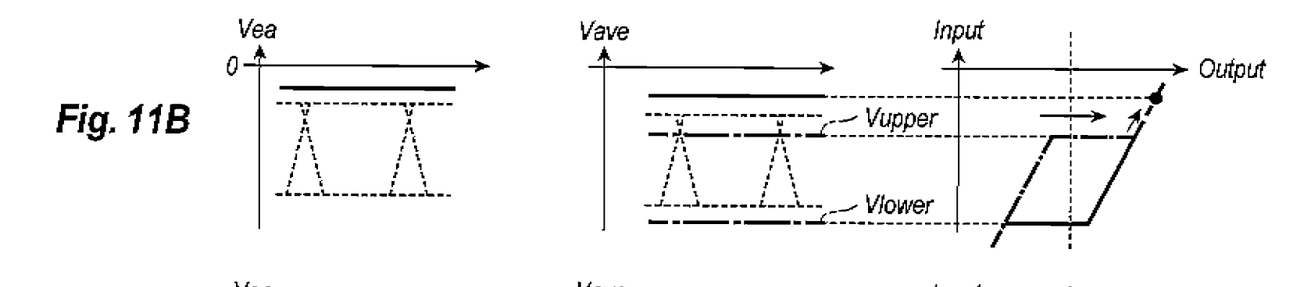
Figure 11C:
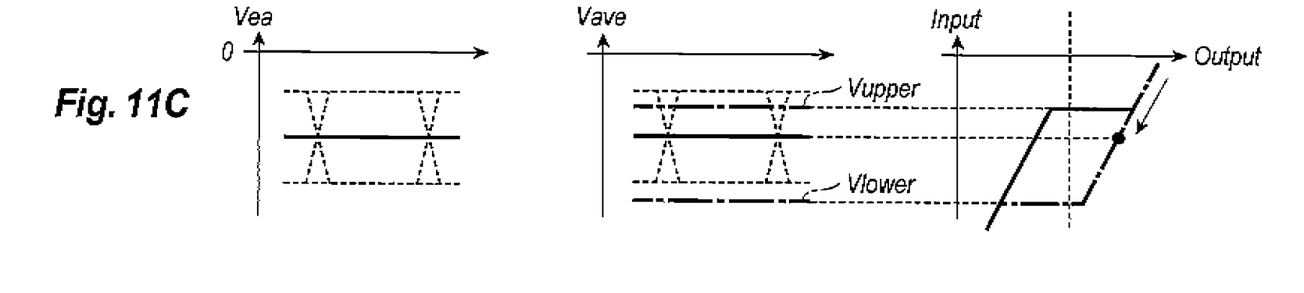

The mechanism to adjust the cross point of the output Dout in the transmitter optical module 10B will be described. FIG. 11A shows statuses when the modulation signal exists and the offset generator 51 is selected in the offset controller 50; FIG. 11B shows statuses of no modulation signal but the offset generator 51 is still selected; and FIG. 11C shows statuses of no modulation signal and the offset controller 50 selects the preset generator 52. When the modulation signal exists, as shown in FIG. 11A, the average Vave just corresponds to an average of the output Dout, which is slightly higher than the center of the eye diagram of the output Dout but lower than the upper reference Vupper due to the operation of the average adjustor 25.

Under a condition shown in FIG. 11B, namely, the modulation signal becomes absent but no offset adjustment is carried out by the offset controller 50, the output Dout of the driver circuit 70 is set higher than the HIGH level in the ordinary state shown in FIG. 11A because the cross point of the output Dout under the ordinary operation is shifted higher. This results in the condition where the average Vave becomes higher than the upper reference Vupper and the signal detector 40B outputs the control signal to the offset controller 50 to select the preset generator 52. Then, the status moves to the condition shown in FIG. 11C. Under the second status shown in FIG. 11B, although the EA device 21 outputs light with excessive optical power, the condition immediately turns to the status shown in FIG. 11C within a switching time of the offset controller 50.

Under the status of FIG. 11C, the output Dout of the driver circuit 70 is set in the midpoint of the eye diagram by providing the offset from the preset generator 52. Because the midpoint of the eye diagram is lower than the average Vave, the offset controller 50 possibly selects the offset generator 51 when the signal detector like those in the aforementioned embodiments has no hysteresis function. Because the signal detector 40B of the present embodiment has the hysteresis function with two references, Vupper and Vlower, the output Dout of the driver circuit 70 is held higher than the lower reference Vlower, the offset controller 50 continues to select the preset generator 52.

Under such a condition, the modulation signal appears, the average adjustor 25 forcibly sets the average Vave lower than the reference Vlower, by which the offset controller 50 selects the offset generator 51 and the output Dout of the EA driver 20B recovers the first status of FIG. 11A. The recovery of the ordinary status of the existence of the modulation signal may be carried out in a few milliseconds or longer because the transition from the third status to the first one does not accompany with the excess emission of the optical output of the transmitter optical module 10B.

Thus, the EA driver 20B shows the function same as those realized in the aforementioned EA drivers, 20 and 20A. Moreover, the aforementioned EA driver 20 provides the signal detector 40 in the upstream of the driver circuit 70, which possibly degrades the signal quality or the frequency bandwidth of the EA driver 20 due to the input capacitance of the signal detector 40. The present EA driver 20B detects the existence of the modulation signal by the average Vave of the output Dout of the drive circuit 70 through the resistor 40B1. Because the resistor 40B1 constitutes the filter combined with the capacitor 40B2, the resistor 40B1 may be designed to have large resistance, which suppresses the degradation of the quality of the output Dout neither the reduction of the frequency bandwidth of the driver circuit 70. Also, the hysteresis characteristic of the signal detector 40B combined with the average adjustor 25 effectively prevents the offset controller 50 from an instable operation to select one of generators, 51 and 52.

While particular embodiments of the present invention have been described herein for purposes of illustration, many modifications and changes will become apparent to those skilled in the art. Accordingly, the claims are intended to encompass all such modifications and changes as fall within the true spirit and scope of this invention.

What is claimed is:

1. An electro-absorption (EA) driver to drive an EA device, comprising:
a signal detector configured to detect an existence of a modulation signal;
a driver circuit configured to amplify the modulation signal and generate an output signal; and
an offset controller to provide first and second offsets to the driver circuit depending on the existence of the modulation signal detected by the signal detector, the first offset setting the output of the driver circuit to compensate a non-linearity of the EA device, the second offset setting the output of the driver circuit to prevent an excess optical output of the EA device.

2. The EA driver of claim 1,
wherein the signal detector detects the existence of the modulation signal at an upstream of the driver circuit.

3. The EA driver of claim 1,
wherein the modulation signal is a pair of signals complementary to each other, and
wherein the signal detector detects an average between the pair of signals and a peak hold level of the pair of signals, and decides that the modulation signal is absent when the peak hold level becomes less than the average between the pair of signals added with an offset.

4. The EA driver of claim 1,
wherein the signal detector detects an average of the modulation signal through a low pass filter, and decides that the modulation signal is absent when the average of the modulation signal is less than a reference.

5. The EA driver of claim 1,
wherein the offset controller includes a selector having a first pair of transistors and a current source connected to the first pair of transistors,
wherein one of the first pair of transistors receives an output of the signal detector and another of the first pair of transistors receives a selector reference, the selector selecting the first offset when the output of the signal detector exceeds the selector reference and the second offset when the output of the signal detector is less than the selector reference.

6. The EA driver of claim 5,
further including an offset source,
wherein the offset controller further includes an offset generator and a preset generator, the offset generator including a second pair of transistors commonly connected to one of the first pair of transistors, the preset generator including a third pair of transistors commonly connected to another of the first pair of transistors, and wherein one of the second pair of transistors receives an output of the offset source, another of the second pair of transistors receives an offset reference, one of the third pair of transistors receives a preset offset and another of the third pair of transistors receives a preset reference.

7. The EA driver of claim 1, wherein the driver circuit includes a differential circuit having a pair of transistors, a pair of resistors connected in series to the pair of transistors, and a current source commonly connected to both of the transistors, between a power supply and a ground, the offset controller increasing currents flowing in the pair of resistors by the first and second offsets.

8. The EA driver of claim 7, wherein the driver circuit further includes a pair of cascade transistors connected between the pair of resistors and the pair of transistors, the offset controller adjusting currents flowing in the pair of resistors and the pair of cascade transistors.

9. The EA driver of claim 1, wherein the signal detector detects the existence of the modulation signal at a downstream of the driver circuit.

10. The EA driver of claim 9, wherein the signal detector detects an average of the modulation signal through a low pass filter, and decides that the modulation signal exists when the average of the modulation signal becomes greater than an upper reference.

11. The EA driver of claim 10, further including an average adjuster configured to set the average lower than a lower reference forcibly, the lower reference being lower than the upper reference.

12. The EA driver of claim 10, wherein the signal detector decides that the modulation signal exists when the average forcibly set lower than the lower reference becomes greater than the lower reference.

* * * * *